US011292153B2

(12) United States Patent
Qiu et al.

(10) Patent No.: US 11,292,153 B2
(45) Date of Patent: Apr. 5, 2022

(54) PRODUCTION DEVICE FOR MANUFACTURING PRODUCTS IN THE FORM OF SHEETS OR BLOCKS, AND METHOD THEREOF

(71) Applicant: VEEGOO TECHNOLOGY CO., LTD., Foshan (CN)

(72) Inventors: Jianping Qiu, Foshan (CN); Zhongyuan Li, Foshan (CN); Shiyang Zhu, Foshan (CN)

(73) Assignee: VEEGOO TECHNOLOGY CO., LTD., Foshan (CN)

( * ) Notice: Subject to any disclaimer, the term of this patent is extended or adjusted under 35 U.S.C. 154(b) by 415 days.

(21) Appl. No.: 16/327,736

(22) PCT Filed: Aug. 22, 2017

(86) PCT No.: PCT/CN2017/098475
§ 371 (c)(1),
(2) Date: Feb. 22, 2019

(87) PCT Pub. No.: WO2018/036477
PCT Pub. Date: Mar. 1, 2018

(65) Prior Publication Data
US 2019/0176112 A1 Jun. 13, 2019

(30) Foreign Application Priority Data
Aug. 24, 2016 (CN) .......................... 201610715646.7

(51) Int. Cl.
*B28B 13/02* (2006.01)
*B28C 7/00* (2006.01)
(Continued)

(52) U.S. Cl.
CPC ...... *B28B 13/0215* (2013.01); *B01F 13/1072* (2013.01); *B01F 15/0229* (2013.01);
(Continued)

(58) Field of Classification Search
CPC ...... B01F 13/00; B01F 13/10; B01F 13/1008; B01F 13/1022; B01F 13/1027;
(Continued)

(56) References Cited

U.S. PATENT DOCUMENTS 3,701,409 A * 10/1972 Gagnon ................. B65G 65/42
198/534
3,759,492 A * 9/1973 Hall .......................... B28C 9/00
366/49
(Continued)

FOREIGN PATENT DOCUMENTS

CN           103522402       1/2014
CN           103522402 A * 1/2014
(Continued)

OTHER PUBLICATIONS

Epacenet Machine Translation of CN 103522402A, CN publication of Jan. 2014, 20 pages (Year: 2014).*
(Continued)

*Primary Examiner* — Tony G Soohoo
(74) *Attorney, Agent, or Firm* — Hamre, Schumann, Mueller & Larson, P.C.

(57) ABSTRACT

A production device for manufacturing a product in the form of a sheet or a block, including: an initial agitator (1), a primary conveyor belt (2) and a mixing agitator (3); each of initial agitators (1) is configured with the primary conveyor belt (2), one or more stones or a stone-like granular material having a selected particle size and a binder are initially mixed in the initial agitator (1) and then an initial mixture is obtained; the mixing agitator (3) includes a rotating container for undertaking a material; the initial mixture is conveyed to the mixing agitator (3) through the primary conveyor belt (2); more than one initial agitator and matched (Continued)

primary conveyor belts thereof are disposed around the mixing agitator (3) at intervals.

9 Claims, 4 Drawing Sheets

(51) Int. Cl.
| | |
|---|---|
| *B29B 7/58* | (2006.01) |
| *B29B 7/34* | (2006.01) |
| *B29C 67/24* | (2006.01) |
| *B28C 7/04* | (2006.01) |
| *B28B 1/00* | (2006.01) |
| *B28C 7/16* | (2006.01) |
| *B01F 15/02* | (2006.01) |
| *B01F 13/00* | (2006.01) |
| *B29B 7/38* | (2006.01) |
| *B29B 7/80* | (2006.01) |
| *B32B 37/10* | (2006.01) |
| *B44C 5/04* | (2006.01) |
| *B01F 13/10* | (2006.01) |
| *B01F 7/00* | (2006.01) |

(52) U.S. Cl.
CPC ............... *B28B 1/005* (2013.01); *B28C 7/00* (2013.01); *B28C 7/0481* (2013.01); *B28C 7/162* (2013.01); *B29B 7/34* (2013.01); *B29B 7/58* (2013.01); *B29C 67/242* (2013.01); *B32B 37/1027* (2013.01); *B44C 5/0438* (2013.01); *B01F 7/00* (2013.01); *B01F 13/00* (2013.01); *B01F 13/10* (2013.01); *B01F 13/1022* (2013.01); *B01F 13/1027* (2013.01); *B01F 2013/1052* (2013.01); *B29B 7/38* (2013.01); *B29B 7/802* (2013.01)

(58) Field of Classification Search
CPC .............. B01F 13/1072; B01F 15/0229; B01F 2013/1052; B01F 7/00; B01F 9/10; B28B 13/0215; B28B 13/0295; B28B 1/005; B28C 5/1276; B28C 7/00; B28C 7/0481; B28C 7/162; B29B 7/34; B29B 7/38; B29B 7/58; B29B 7/802; B29C 67/242; B32B 37/1027; B44C 5/0438; B44F 9/04
See application file for complete search history.

(56) References Cited

U.S. PATENT DOCUMENTS

| | | | | |
|---|---|---|---|---|
| 4,306,595 A * | 12/1981 | Longinotti | ............ | B28B 13/022 141/177 |
| 4,321,028 A * | 3/1982 | Van de Caveye | .. | B28B 13/0215 198/580 |
| 4,543,145 A * | 9/1985 | Schnell | .................... | B32B 38/08 156/231 |
| 4,654,108 A * | 3/1987 | Kurata | ................ | E04F 13/0862 156/297 |
| 5,925,209 A * | 7/1999 | Mosburger | .............. | B32B 37/06 156/292 |
| 6,319,545 B1 * | 11/2001 | Laurent | .................... | B05D 1/12 427/136 |
| 6,367,530 B1 * | 4/2002 | Shimotomai | ........... | B29C 43/56 156/382 |
| 7,320,539 B2 * | 1/2008 | Christenson | ............ | B01F 7/022 366/14 |
| 7,322,815 B2 * | 1/2008 | Izzo | ........................ | B01F 9/106 425/447 |
| 8,444,892 B2 * | 5/2013 | Toncelli | ................ | B28B 13/022 264/113 |
| 9,579,821 B2 * | 2/2017 | Toncelli | .................... | B01F 3/184 |
| 10,166,698 B2 * | 1/2019 | Piantoni | ............ | A61F 13/15707 |
| 10,821,714 B2 * | 11/2020 | Van Vlassenrode | .... | B29C 43/24 |
| 10,828,879 B2 * | 11/2020 | Van Vlassenrode | ........................ | B32B 37/142 |
| 2005/0219939 A1* | 10/2005 | Christenson | .......... | B28C 7/0481 366/8 |
| 2006/0048900 A1* | 3/2006 | Welter | ................ | B32B 37/1284 156/550 |
| 2008/0113123 A1* | 5/2008 | Izzo | ..................... | B28B 13/027 428/15 |
| 2008/0310247 A1* | 12/2008 | Basaraba | ............ | C04B 40/0028 366/8 |
| 2014/0016428 A1* | 1/2014 | Akai | ...................... | B29B 7/801 366/76.2 |
| 2019/0105800 A1* | 4/2019 | Xie | ..................... | B01F 7/161 |
| 2019/0176112 A1* | 6/2019 | Qiu | ..................... | B01F 9/10 |
| 2019/0176113 A1* | 6/2019 | Qiu | ..................... | B01F 15/0229 |
| 2019/0232524 A1* | 8/2019 | Toncelli | .................. | B28B 7/364 |
| 2021/0001616 A1* | 1/2021 | Van Vlassenrode | ........................ | B29C 70/506 |

FOREIGN PATENT DOCUMENTS

| | | | | |
|---|---|---|---|---|
| CN | 204844494 | * | 12/2015 | .............. B28C 7/00 |
| JP | 3992180 B2 | | 10/2007 | |

OTHER PUBLICATIONS

International Search Report issued for International Patent Application No. PCT/CN2017/098475, dated Nov. 10, 2017, 6 pages including English translation.

First Office Action issued for Chinese Patent Application No. 201610715646.7, dated May 4, 2018, 13 pages including English translation.

Extended European Search Report issued for European Patent Application No. 17842899.1, dated Apr. 2, 2020, 8 pages.

* cited by examiner

PRODUCTION DEVICE FOR MANUFACTURING PRODUCTS IN THE FORM OF SHEETS OR BLOCKS, AND METHOD THEREOF

TECHNICAL FIELD

The present disclosure relates to a production method and device of a product in the form of a sheet or a block, and more particularly to a production device for manufacturing a product in the form of a sheet or a block and a method thereof.

BACKGROUND

In order to meet the increasing aesthetic requirements of consumers and increase their market competitiveness, a product in the form of a sheet or a block is required to add more colors to the product by improving the technology, and obtain more patterns.

In the prior art, the components of the product in the form of a sheet or a block, which are generally one or more stones or stone-like granular materials having a selected particle size and binder, are initially mixed in the respective initial agitators to obtain initial mixture. Each layer of the initial mixture is deposited onto the surface of a conveyor belt in sequence such that each layer is arranged on the immediately preceding layer to form a multilayer or composite mixture structure, then the multilayer or composite mixture structure is fed through the conveyor belt to a container or support member which is rotated at a controlled speed, and subsequent compaction, hardening and the like are performed after the discharge. In this prior art, each layer of the initial mixture is superposed in sequence in a direction perpendicular to the surface of the conveyor belt, and after the layer of the latter initial mixture is deposited onto the layer of the preceding initial mixture, the preceding initial mixture cannot be improved in other technology. Once the position of each initial agitator relative to the holder of the conveyor belt (for mounting the conveyor belt) is fixed, the initial mixture component with the largest requirements of technology is definitely arranged in an initial agitator farthest from the container or support member rotated at a controlled speed to perform the preliminary processing. Other initial mixtures are gradually arranged in a direction of getting close to the container or support member rotated at a controlled speed as gradual reduction in requirements of technology. Too many restrictions on the technology arrangement are not conducive to develop new technology, and impede the progress of product upgrades.

SUMMARY

For the above defects, the main objective of the present disclosure is to provide a production device for manufacturing a product in the form of a sheet or a block and a method thereof.

In view of this, the above-mentioned objective is achieved with the following technical solutions.

A production device for manufacturing a product in the form of a sheet or a block is provided, the production device includes: an initial agitator, a primary conveyor belt, and a mixing agitator;

each of initial agitators is provided with a primary conveyor belt, one or more stones or a stone-like granular material having a selected particle size and a binder are initially mixed in the initial agitator and then an initial mixture is obtained; the mixing agitator includes a rotating container for undertaking a material; the initial mixture is conveyed to the mixing agitator through the primary conveyor belt; more than one initial agitators and matched primary conveyor belts of the initial agitators are disposed around the mixing agitator at intervals.

Preferably, the production device further includes a dispersing apparatus, the dispersing apparatus includes a rolling brush and a driving assembly, the rolling brush is disposed above a discharge end of the primary conveyor belt and is rotated under driving of the driving assembly, the discharge end of the primary conveyor belt is disposed above the rotating container; the initial mixture passes through a gap between the rolling brush and the primary conveyor belt under driving of the primary conveyor belt.

Preferably, the rolling brush includes a rotating shaft and a rolling brush base, a plurality of the rolling brush bases are detachably fitted and fixed onto the rotating shaft in parallel;

the rolling brush base includes a base portion and a rolling brush rod, the base portion is an annular structure that can be fitted on the rotating shaft, one end of the rolling brush rod is fixed on the annular structure, and the other end extends radially outward along a radial direction of the annular structure, and a plurality of the rolling brush rods are radially distributed around the annular structure.

Preferably, a side wall of an inner ring of the base portion is provided with an outwardly recessed mounting groove, and an outer side wall of the rotating shaft is provided with a mounting rib which can be inserted into the mounting groove exactly, and the mounting rib extends along a longitudinal direction of the rotating shaft.

Preferably, the base portion and the rolling brush rod are joined into integration by casting or bonding.

Preferably, the rolling brush rod is made of a non-metal material.

Preferably, a twin-roll dispersing apparatus and a secondary conveyor belt are disposed between the primary conveyor belt and the mixing agitator, and a discharge end of the secondary conveyor belt is disposed above the rotating container;

the twin-roll dispersing apparatus includes two rotating rollers and a driving assembly, and the two rotating rollers are disposed in parallel and rotated in opposite directions under driving of the driving assembly; the initial mixture is conveyed through the primary conveyor belt and then dropped down between the two rotating rollers, and dropped onto a surface of the secondary conveyor belt with rotating of the two rotating rollers, the secondary conveyor belt conveys a dispersed mixture into the rotating container.

A method for manufacturing a product in the form of a sheet or a block is provided, the method includes: preparing an initial mixture mainly including one or more stones or a stone-like granular material having a selected particle size and a binder; depositing a layer of the mixture having a predetermined thickness onto a surface of the conveyor belt; performing a pre-compression; and obtaining a roughly formed material, such that the initial mixture includes at least two single mixtures; each initial agitator is provided with a primary conveyor belt, a plurality of initial mixtures are directly conveyed into a rotating container or support member through respectively provided primary conveyor belts from different directions around the rotating container or support member; and when discharged from the rotating container or support member, a final mixture is conveyed to complete subsequent pre-compression and hardening in sequence.

Preferably, one or more of layers of initial mixtures deposited on the surface of the primary conveyor belt are reprocessed respectively according to respective requirement of technology by using a specific device.

Preferably, the specific device is a spouting plants or a dusting apparatus.

Each initial agitator is provided with a primary conveyor belt. One or more of the layers of the initial mixtures deposited on the surface of the primary conveyor belt in parallel are reprocessed respectively by using a specific device according to respective requirement of technology, such as a layer of the initial mixture in a certain color in the product is agglomerated or clumped, or a layer of some initial mixture is rolled, which facilitates the expansion of the new technology of the product and increases new types of the product. In addition, during the process of conveying the initial mixture on the primary conveyor belt, a uniform and tight initial mixture layer is obtained under an action of unavoidable vibration caused by the operation of the primary conveyor belt, which facilitates the subsequent processing.

Figure 1:
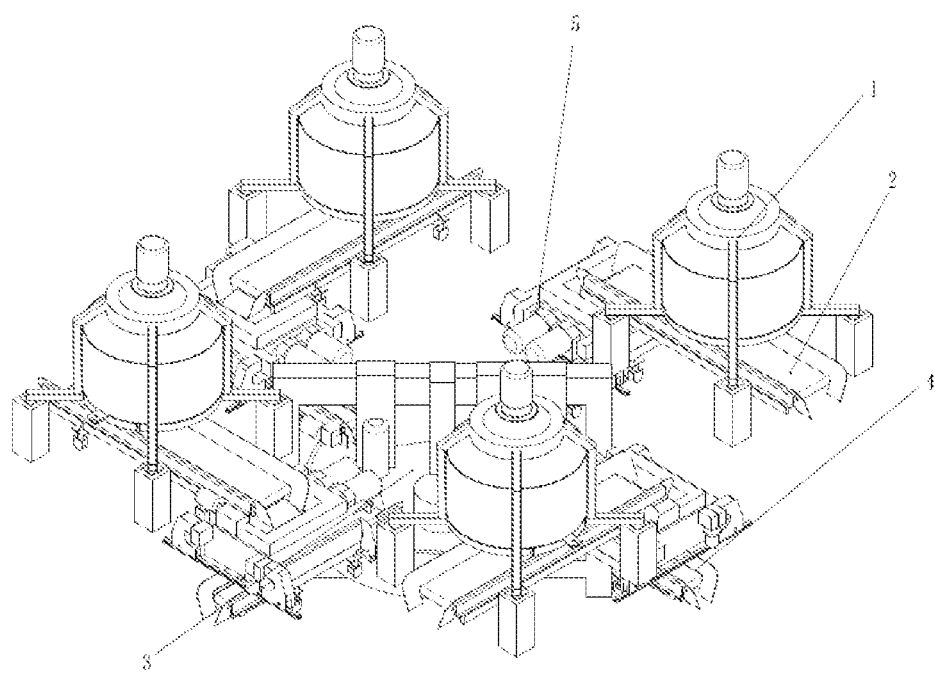
FIG. 1 is a schematic diagram of a space structure according to an embodiment of the present disclosure.

REFERENCE NUMERALS initial agitator 1, primary conveyor belt 2, mixing agitator 3, secondary conveyor belt 4;

dispersing apparatus 5, rolling brush 51, rotating shaft 510, rolling brush base 511, base portion 5110, rolling brush rod 5111, mounting groove 5112, driving assembly 52.

DETAILED DESCRIPTION OF THE EMBODIMENTS

The technical solution of the present disclosure will be detailed through the following embodiments in conjunction with the accompanying drawings.

Figure 2:
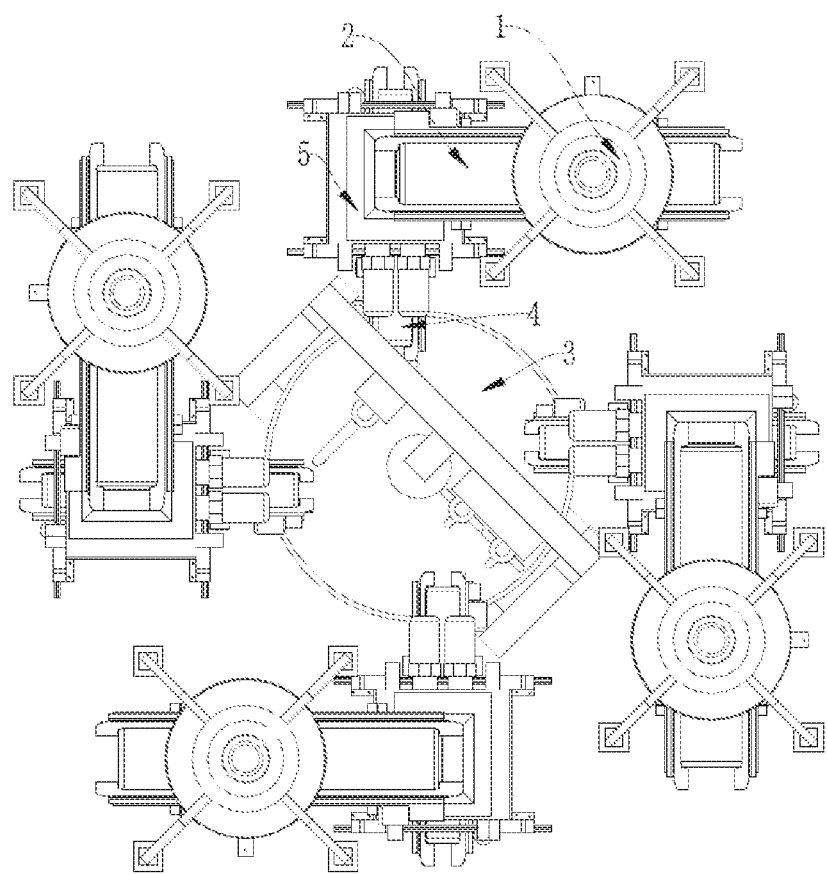
FIG. 2 is a top view thereof according to an embodiment of the present disclosure.

As shown in FIG. 1 and FIG. 2, a production device for manufacturing a product in the form of a sheet or a block includes: an initial agitator 1, a primary conveyor belt 2, and a mixing agitator 3.

Each of the initial agitators 1 is provided with a primary conveyor belt 2, one or more stones or a stone-like granular material having a selected particle size and a binder are initially mixed in the initial agitator 1 and then an initial mixture is obtained. The mixing agitator 3 includes a rotating container for undertaking materials. The initial mixture is conveyed to the mixing agitator 3 through the primary conveyor belt 2. More than one initial agitator 1 and matched primary conveyor belt 2 thereof are disposed around the mixing agitator 3 at intervals.

After multiple initial mixtures with different components are initially uniformly mixed in the respective initial agitating and mixing device, the multiple initial mixtures are respectively deposited to the surface of the corresponding primary conveyor belts 2 in a predetermined thickness, and the primary conveyor belts 2 convey the different initial mixtures to the rotating container or a support member, i.e., the rotating container of the mixing agitator 3 in this embodiment, to intensively mix. Finally, the multi-component or composite mixture having a uniform composition is discharged from the rotating container or the support member, and is continuously conveyed to complete subsequent pre-compression and hardening steps in sequence so as to obtain a product in the form of a sheet or block.

Each initial mixture is separately mixed and processed in each initial agitator 1 respectively, and the operation of each initial agitator 1 does not interfere with each other. When the system is in operation, the materials in each initial agitator 1 can be controlled according to a selected technology so as to convey each initial mixture into the rotating container or support member regularly and quantificationally, thereby implementing flexible adjustment of the product technology, facilitating the development of the manufacturability of the product, and increasing new types of products.

Each initial agitator 1 is provided with a primary conveyor belt 2. One or more of the layers of the initial mixtures deposited on the surface of the primary conveyor belt 2 in parallel are reprocessed respectively according to respective requirement of technology by using a specific device, such as a layer of the initial mixture in a certain color in the product is agglomerated or clumped, or a layer of some initial mixture is rolled, which facilitates the expansion of the new process of the product and increases new types of the product. In addition, during the process of conveying the initial mixture on the primary conveyor belt 2, a uniform and tight initial mixture layer is obtained under the action of the unavoidable vibration caused by the operation of the primary conveyor belt 2, which facilitates the subsequent processing. In the practical usage, it is not to agitate and process as much materials in the corresponding initial agitator as how much initial mixtures are needed in the same batch of products. In order to reduce the frequency of switch of each initial agitator 1 and the caused impact on device and production efficiency, each initial agitator 1 agitates the primary mixture for which each initial agitator is responsible in the maximum load; and when mixing the materials in each initial agitator 1, the proportion of each initial mixture in the final product is controlled by controlling the speed of the primary conveyor belt 2 corresponding to each initial agitator 1. The primary conveyor belt 2 is provided with a weighing apparatus. By setting parameters of the weighing apparatus, the weighing apparatus controls the primary conveyor belt 2 to stop working when the amount fed into the mixing agitator 3 through the primary conveyor belt 2 reaches the required amount of the technology. The accurate blanking provides a strong guarantee for the quality of the final products.

Figure 3:
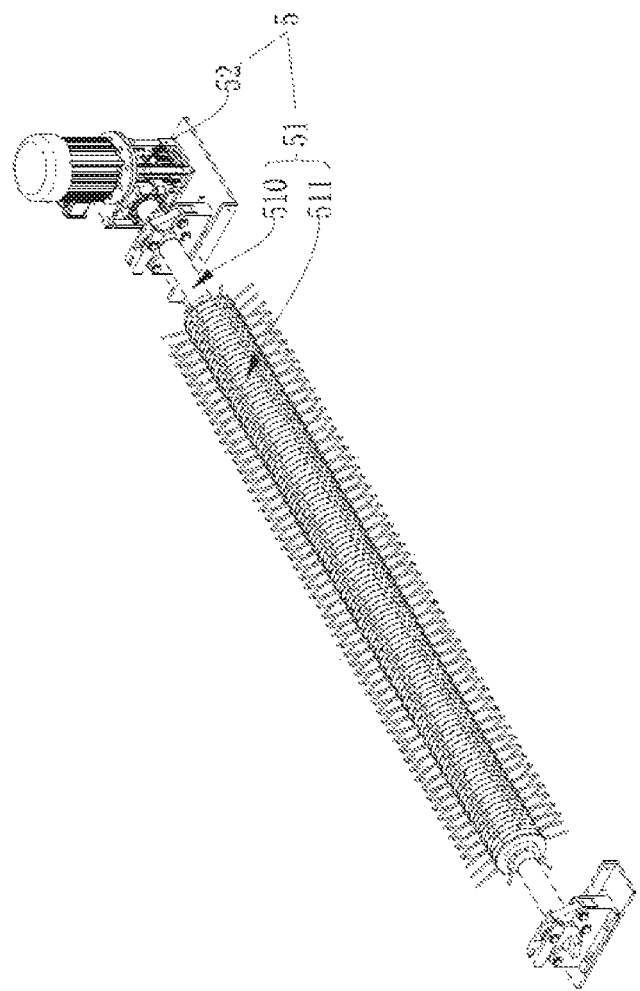
FIG. 3 is a schematic diagram of a dispersing apparatus according to an embodiment of the present disclosure.
Figure 4:
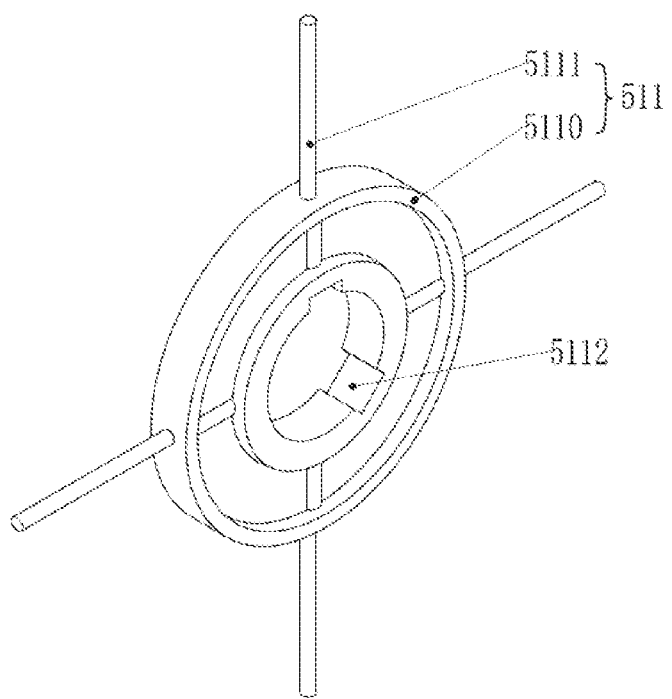
FIG. 4 is a schematic diagram of a rolling brush base according to an embodiment of the present disclosure.

As shown in FIGS. 3 and 4, a dispersing apparatus 5 is further included. The dispersing apparatus 5 includes a rolling brush 51 and a driving assembly 52. The rolling brush 51 is disposed above the discharge end of the primary conveyor belt 2 and is rotated under the driving of the driving assembly 52, and the discharge end of the primary conveyor belt 2 is disposed above the rotating container. The initial mixture passes through the gap between the rolling brush 51 and the primary conveyor belt 2 under the driving of the primary conveyor belt 2.

When entering the summary conveyor belt 3 from the primary conveyor belt 2, the initial mixture is dispersed by the rolling brush 51 driven by the driving assembly 52 in cooperation with the primary conveyor belt 2, to avoid occurrence of non-conformity large agglomerates in the initial mixture, and facilitate subsequent uniform mixing with other initial mixtures.

The rolling brush 51 includes a rotating shaft 510 and a rolling brush base 511, a plurality of the rolling brush bases 511 are detachably fitted and fixed onto the rotating shaft 510 in parallel.

The rolling brush base 511 includes a base portion 5110 and a rolling brush rod 5111. The base portion 5110 is an annular structure that can be fitted on the rotating shaft 510. One end of the rolling brush rod 5111 is fixed on the annular structure, and the other end extends radially outward along a radial direction of the annular structure, and a plurality of the rolling brush rods 5111 are radially distributed around the annular structure.

The rolling brush 51 in this embodiment includes a rotating shaft 510 and a rolling brush base 511. The rolling brush base 511 is detachably fitted and fixed to the rotating shaft 510. When the rotating shaft 510 is rotated, the rolling brush rod 5111 is inserted into the initial mixture and agitates the initial mixture in the direction of the summary conveyor belt 3, and the process of agitating is the process of dispersing and conveying. A plurality of rolling brush bases 511 are detachably fitted and fixed on the rotating shaft 510 in parallel. In use, when the rolling brush rod 5111 on one of the rolling brush bases 511 is broken, the rolling brush base with the broken rolling brush rod 5111 can be detached and replaced with a brand new rolling brush base 511, to continue to use with other good parts, thereby saving the costs, improving resource utilization, and installing and disassembling easily, and being suitable for vigorous promotion.

The side wall of the inner ring of the base portion 5110 is provided with an outwardly recessed mounting groove 5112, and the outer side wall of the rotating shaft 510 is provided with a mounting rib which can be inserted into the mounting groove exactly, and the mounting rib extends along the longitudinal direction of the rotating shaft 510.

The mounting ribs are disposed along the longitudinal direction of the rotating shaft 510. In this embodiment, each rotating shaft 510 is provided with two mounting ribs. When the rolling brush base 511 is mounted on the rotating shaft 510, the annular base portion 5110 is directly fitted to the rotating shaft 510, and the mounting ribs 5112 are fitted to the mounting grooves 5110. The side wall of the mounting grooves 5112 limit the relative rotation between the rolling brush base 511 and the rotating shaft 510, and the friction between the mounting grooves 5112 and the side walls of the mounting ribs limits the relative movement of the mounting groove and the mounting ribs in the absence of action of too much axial external force.

The base portion 5110 and the rolling brush rod 5111 are joined into integration by casting or bonding.

The integrated structure avoids stress concentration and loss of the apparatus caused by low synchronicity of the components when rotating in a case that the components are not connected or integrated.

The rolling brush rod 5111 is made of a non-metal material.

The exclusion of metal material is to avoid producing chemical reaction when the rolling brush rod 5111 comes into contact with the initial mixture, and ensure that the product material is not affected by a material which is not technically required; and also to avoid qualitative change of the metal material such as rusting which will pollute the product material.

A twin-roll dispersing device 5 and a secondary conveyor belt 4 are disposed between the primary conveyor belt 2 and the mixing agitator 3, and the discharge end of the secondary conveyor belt 4 is disposed above the rotating container.

The twin-roll dispersing device 5 includes two rotating rollers and a driving assembly, and the two rotating rollers are disposed in parallel and rotated in opposite directions under the driving of the driving assembly. The initial mixture is conveyed through the primary conveyor belt 2 and then dropped down between the two rotating rollers, and dropped onto the surface of the secondary conveyor belt 4 with rotating of the two rotating rollers. The secondary conveyor belt 4 conveys the dispersed mixture into the rotating container.

When entering the mixing agitator 3 from the primary conveyor belt 2, the initial mixture is rotated by the two rotating rollers driven by the driving assembly at first, the initial mixture is dropped down between the two rotating rollers after being conveyed through the primary conveyor belt 2, and then the initial mixture is dispersed by the force of the two rotating rollers moving in opposite directions, thereby avoiding occurrence of non-compliant large agglomerates in the initial mixture, and facilitating the subsequent uniform mixing with other initial mixtures.

A method for manufacturing a product in the form of a sheet or a block is provided, the method includes the following steps: preparing an initial mixture mainly including one or more stones or a stone-like granular material having a selected particle size and a binder; depositing a layer of the mixture having a predetermined thickness onto a surface of the conveyor belt; performing a pre-compression step and a final step of obtaining a roughly formed material, such that the initial mixture includes at least two single mixtures. Each initial agitator 1 is provided with a primary conveyor belt 2. A plurality of initial mixtures are directly conveyed into the rotating container or support member through respectively primary conveyor belts 2 from different directions around the rotating container or support member, and when discharged from the rotating container or support member, the final mixture is conveyed to complete subsequent pre-compression and hardening steps in sequence.

One or more of the layers of the initial mixtures deposited on the surface of the primary conveyor belt 2 are reprocessed respectively according to respective requirement of technology by using a specific device.

Since each layer of the initial mixture is not superposed in the direction perpendicular to the surface of the conveyor belt, one or more layers of the initial mixtures deposited on the surface of the primary conveyor belt 2 can be reprocessed through a specific device of the required technology according to the requirements of the product technology, for example, a layer of an initial mixture in a certain color in the product is agglomerated or clumped, or a layer of an initial mixture is rolled, thereby facilitating the development of the new technology of the products and increasing new types of the products.

The specific device is a spouting plant or a dusting apparatus.

It is also possible to dispose a spouting plant or a dusting device above corresponding layer of the initial mixture spouting plant to color the initial mixture, which simplifies the steps of production line and improves the production efficiency.

The technical principle of the present disclosure has been described above in conjunction with the specific embodiments. The above description is merely to illustrate the principle of the disclosure and not to be construed as limiting the scope of the present disclosure. Based on the illustration herein, those skilled in the art, without any creative work, can conceive other embodiments of the present disclosure which should also be seen in the scope of the technical solutions of the present disclosure.

What is claimed is:

1. A production device for manufacturing a product in the form of a sheet or a block, comprising: a plurality of initial agitators, a plurality of primary conveyor belts, and a mixing agitator;

wherein each of the initial agitators is provided with a primary conveyor belt, one or more stones or a stone-like granular material having a selected particle size and a binder are initially mixed in the initial agitator and then an initial mixture is obtained; the mixing agitator comprises a rotating container for undertaking a material; the initial mixture is conveyed to the mixing agitator through the primary conveyor belt; more than one initial agitator and matched primary conveyor belts thereof are disposed around the mixing agitator at intervals;

wherein the production device further comprises a dispersing apparatus, the dispersing apparatus comprises a rolling brush and a driving assembly, the rolling brush is disposed above a discharge end of the primary conveyor belt and is rotated under driving of the driving assembly, the discharge end of the primary conveyor belt is disposed above the rotating container; the initial mixture passes through a gap between the rolling brush and the primary conveyor belt under driving of the primary conveyor belt;

wherein a side wall of an inner ring of a base portion is provided with an outwardly recessed mounting groove, and an outer side wall of a rotating shaft is provided with a mounting rib which can be inserted into the mounting groove exactly, and the mounting rib extends along a longitudinal direction of the rotating shaft.

2. The production device for manufacturing a product in the form of a sheet or a block according to claim 1, wherein the rolling brush comprises the rotating shaft and a rolling brush base, a plurality of the rolling brush bases are detachably fitted and fixed onto the rotating shaft in parallel;

the rolling brush base comprises the base portion and a rolling brush rod, the base portion is an annular structure that can be fitted on the rotating shaft, one end of the rolling brush rod is fixed on the annular structure, and the other end extends radially outward along a radial direction of the annular structure, and a plurality of the rolling brush rods are radially distributed around the annular structure.

3. The production device for manufacturing a product in the form of a sheet or a block according to claim 1, wherein the base portion and the rolling brush rod are joined into integration by casting or bonding.

4. The production device for manufacturing a product in the form of a sheet or a block according to claim 1, wherein the rolling brush rod is made of a non-metal material.

5. The production device for manufacturing a product in the form of a sheet or a block according to claim 1, wherein a twin-roll dispersing apparatus and a secondary conveyor belt are disposed between the primary conveyor belt and the mixing agitator, and a discharge end of the secondary conveyor belt is disposed above the rotating container;

the twin-roll dispersing apparatus includes two rotating rollers and a driving assembly, and the two rotating rollers are disposed in parallel and rotated in opposite directions under the driving of the driving assembly; the initial mixture is conveyed through the primary conveyor belt and then dropped down between the two rotating rollers, and dropped onto a surface of the secondary conveyor belt with rotating of the two rotating rollers, the secondary conveyor belt conveys a dispersed mixture into the rotating container.

6. A method for manufacturing a product in the form of a sheet or a block, comprising:

preparing an initial mixture mainly including one or more stones or a stone-like granular material having a selected particle size and a binder;

depositing a layer of the mixture having a predetermined thickness onto a surface of the conveyor belt;

performing a pre-compression; and obtaining a roughly formed material, such that the initial mixture comprises at least two single mixtures, wherein each initial agitator is provided with a primary conveyor belt, a plurality of initial mixtures are directly conveyed into a rotating container or support member through respectively primary conveyor belts from different directions around the rotating container or support member; and when discharged from the rotating container or support member, a final mixture is conveyed to complete subsequent pre-compression and hardening in sequence, wherein the initial mixture passes through a gap between a rolling brush of a dispersing apparatus and the primary conveyor belt under driving of the primary conveyor belt, wherein the rolling brush is disposed above a discharge end of the primary conveyor belt and is rotated under driving of a driving assembly of the dispersing apparatus, the discharge end of the primary conveyor belt being disposed above the rotating container, and wherein a side wall of an inner ring of a base portion is provided with an outwardly recessed mounting groove, and an outer side wall of a rotating shaft is provided with a mounting rib which can be inserted into the mounting groove exactly, and the mounting rib extends along a longitudinal direction of the rotating shaft.

7. The method for manufacturing a product in the form of a sheet or a block according to claim 6, wherein one or more of layers of initial mixtures deposited on the surface of the primary conveyor belt are reprocessed respectively according to respective requirement of technology by using a specific device.

8. The method for manufacturing a product in the form of a sheet or a block according to claim 7, wherein the specific device is a spouting plant or a dusting apparatus.

9. A production device for manufacturing a product in the form of a sheet or a block, comprising: a plurality of initial agitators, a plurality of primary conveyor belts, and a mixing agitator;

wherein each of the initial agitators is provided with a primary conveyor belt, one or more stones or a stone-like granular material having a selected particle size and a binder are initially mixed in the initial agitator and then an initial mixture is obtained; the mixing agitator comprises a rotating container for undertaking a material; the initial mixture is conveyed to the mixing agitator through the primary conveyor belt more than one initial agitator and matched primary conveyor belts thereof are disposed around the mixing agitator at intervals;

wherein the production device further comprises a dispersing apparatus, the dispersing apparatus comprises a rolling brush and a driving assembly, the rolling brush is disposed above a discharge end of the primary conveyor belt and is rotated under driving of the driving assembly, the discharge end of the primary conveyor belt is disposed above the rotating container; the initial mixture passes through a gap between the rolling brush and the primary conveyor belt under driving of the primary conveyor belt;

wherein the rolling brush comprises a rotating shaft and a rolling brush base, a plurality of the rolling brush bases are detachably fitted and fixed onto the rotating shaft in parallel;

the rolling brush base comprises the base portion and a rolling brush rod, the base portion is an annular structure that can be fitted on the rotating shaft, one end of the rolling brush rod is fixed on the annular structure, and the other end extends radially outward along a radial direction of the annular structure, and a plurality of the rolling brush rods are radially distributed around the annular structure;

wherein a side wall of an inner ring of the base portion is provided with an outwardly recessed mounting groove, and an outer side wall of the rotating shaft is provided with a mounting rib which can be inserted into the mounting groove exactly, and the mounting rib extends along a longitudinal direction of the rotating shaft.

* * * * *